(12) United States Patent
Sauer et al.

(10) Patent No.: US 11,678,782 B2
(45) Date of Patent: Jun. 20, 2023

(54) VACUUM CLEANER FILTER BAGS COMPRISING RECYCLED TEXTILE MATERIALS AND/OR COTTON LINTERS

(71) Applicant: EUROFILTERS N.V., Overpelt (BE)

(72) Inventors: Ralf Sauer, Overpelt (BE); Jan Schultink, Overpelt (BE)

(73) Assignee: EUROFILTERS N.V., Overpelt (BE)

( * ) Notice: Subject to any disclaimer, the term of this patent is extended or adjusted under 35 U.S.C. 154(b) by 0 days.

(21) Appl. No.: 16/340,019

(22) PCT Filed: Sep. 6, 2017

(86) PCT No.: PCT/EP2017/072345
§ 371 (c)(1),
(2) Date: Apr. 5, 2019

(87) PCT Pub. No.: WO2018/065164
PCT Pub. Date: Apr. 12, 2018

(65) Prior Publication Data
US 2020/0060489 A1 Feb. 27, 2020

(30) Foreign Application Priority Data

Oct. 6, 2016 (EP) .................................... 16192650

(51) Int. Cl.
*A47L 9/14* (2006.01)
*B01D 39/04* (2006.01)
(Continued)

(52) U.S. Cl.
CPC ................ *A47L 9/14* (2013.01); *B01D 39/04* (2013.01); *B01D 39/06* (2013.01); *B01D 39/163* (2013.01);
(Continued)

(58) Field of Classification Search
CPC ........ B01D 39/16; B01D 39/20; B01D 39/02; B01D 39/163; B01D 39/23; B01D 39/18;
(Continued)

(56) References Cited

U.S. PATENT DOCUMENTS 6,364,647 B1 * 4/2002 Sanborn ................. D01D 4/025
425/192 S
6,395,342 B1 * 5/2002 Kadowaki ................. B29B 9/14
264/103
(Continued)

FOREIGN PATENT DOCUMENTS

| CN | 101023854 A | 8/2007 |
| CN | 101684634 A | 3/2010 |

(Continued)

OTHER PUBLICATIONS

Bhat, G. S., & Malkan, S. R. "4.10.1 Polymers for Meltblowing." in: Russell, S. J., Handbook of Nonwovens (Boca Raton, CRC Press; Cambridge, England, Woodhead Publishing Limited in association with The Textile Institute, 2007), pp. 180-181.
(Continued)

*Primary Examiner* — Robert A Hopkins
*Assistant Examiner* — Qianping He
(74) *Attorney, Agent, or Firm* — Faegre Drinker Biddle & Reath LLP (57) ABSTRACT

The present invention relates to vacuum cleaner filter bags composed of waste products of the textile industry. In addition, possibilities of use for waste products of the textile industry for vacuum cleaner filter bags are provided. The vacuum cleaner filter bag comprising a wall surrounding an inner space and composed of an air-permeable material and an inlet opening introduced into the wall, characterized in that the air-permeable material comprises at least one layer of a nonwoven that comprises fibrous and/or pulverulent (Continued)

recycled textile material and/or cotton linters, with the specific volume of the layer of the nonwoven amounting to at least 20 cm³/g.

17 Claims, 1 Drawing Sheet

(51) Int. Cl.
  *B01D 39/06* (2006.01)
  *B01D 39/16* (2006.01)
  *B01D 39/20* (2006.01)
(52) U.S. Cl.
  CPC ....... *B01D 39/201* (2013.01); *B01D 39/2017* (2013.01); *B01D 2239/0283* (2013.01)
(58) Field of Classification Search
  CPC ............ B01D 39/2027; B01D 39/2017; B01D 39/201; B01D 39/04; B01D 39/06; B01D 2239/0283; B01D 2239/065; B01D 2239/129; B01D 2239/02; B01D 2239/0428; B01D 2239/025; A47L 9/14
  USPC .......................................................... 55/361
  See application file for complete search history.

(56) References Cited

U.S. PATENT DOCUMENTS

| | | | |
|---|---|---|---|
| 2004/0211160 | A1 | 10/2004 | Rammig et al. |
| 2007/0130894 | A1* | 6/2007 | Schultink .................. A47L 9/14 55/381 |
| 2008/0115671 | A1* | 5/2008 | Sauer ...................... A01N 25/34 96/223 |
| 2009/0011675 | A1* | 1/2009 | Ratcliff ................... B32B 37/08 442/327 |
| 2009/0223190 | A1* | 9/2009 | Nauta ...................... D04H 1/64 55/524 |
| 2010/0326902 | A1* | 12/2010 | Midkiff ................... D04H 13/00 210/490 |
| 2011/0030557 | A1 | 2/2011 | Brownstein et al. |
| 2012/0131890 | A1* | 5/2012 | Schultink .................. A47L 9/14 55/368 |
| 2012/0272628 | A1 | 11/2012 | Schultink et al. |
| 2014/0120322 | A1 | 5/2014 | Fu et al. |
| 2014/0174934 | A1* | 6/2014 | Meier ....................... A47L 9/14 55/486 |
| 2014/0278142 | A1 | 9/2014 | Danes et al. |
| 2019/0017202 | A1* | 1/2019 | Cesko ................ B01D 39/1623 |

FOREIGN PATENT DOCUMENTS

| | | |
|---|---|---|
| CN | 101747596 A | 6/2010 |
| CN | 102802485 A | 11/2012 |
| CN | 105342526 A | 2/2016 |
| DE | 19919809 C2 | 11/2000 |
| DE | 10221694 A1 | 12/2003 |
| DE | 202006020047 U1 | 9/2007 |
| DE | 202008003248 U1 | 5/2008 |
| DE | 202008005050 U1 | 6/2008 |
| DE | 102013014920 A1 | 1/2015 |
| EP | 0960645 A2 | 12/1999 |
| EP | 1198280 B1 | 4/2002 |
| EP | 1254693 B1 | 11/2002 |
| EP | 1795247 B1 | 6/2007 |
| EP | 1795427 A1 | 6/2007 |
| EP | 1917895 A1 | 5/2008 |
| EP | 2263507 A1 | 12/2010 |
| EP | 2263508 B1 | 12/2010 |
| EP | 2301404 B1 | 3/2011 |
| EP | 2433695 A1 | 3/2012 |
| EP | 2442703 A1 | 4/2012 |
| WO | 0103802 A1 | 1/2001 |
| WO | 2005060807 A1 | 7/2005 |
| WO | 2011047764 A1 | 4/2011 |
| WO | 2011057641 A1 | 5/2011 |
| WO | 2013106392 A2 | 7/2013 |
| WO | 2014/074398 A2 | 5/2014 |
| WO | 2014/145804 A1 | 9/2014 |

OTHER PUBLICATIONS

Extended European Search report issued in EP Application No. 16192650.6 [with English translation, translated by Google Translate], dated Mar. 23, 2017, 10 pages.
International Preliminary Report on Patentability issued in PCT/EP2017/072345 [with English translation], dated Apr. 18, 2019, 12 pages.
International Search Report and Written Opinion issued in PCT/EP2017/072345 [with English translation], dated Nov. 8, 2017, 15 pages.
"Auswertung van Recyclingstandards (im Kontext zu EP321937481)", Prof. Dr.-Ing. H.-j. Endres., May 27, 2020, 11 pages.
"Kunststoffe-Ku nststoff-Rezyklate—Charakterisierung von Kunststoffabfallen; Deutsche Fassung EN 15347:2007", Plastics-Recycled Plastics-Characterisation of plastics wastes; DIN EN 15347, Dec. 2007, 11 pages.
"Inhalte des ersten und zweiten Semesters sind folgende technische und naturwissenschaftliche Grundlagenfacher", Aufbau, 2019, 5 pages, Online Available at: https://www.oth-aw.de/studiengaenge-und-bildungsangebote/studienangebote/bachelor-studiengaenge/kunststofftechnik/aufbau/.
"Nonwoven Fabrics", Edited by Albrecht, W., Raw Materials, Manufacture, Applications, Characteristics, Testing Processes, 2003, 14 pages.
"Nonwoven Fabrics", Edited by Albrecht, W., Raw Materials, Manufacture, Applications, Characteristics, Testing Processes, 2003, pp. IX-XI and 21-32.
"Uber Materialien und Gegenstande aus recyceltem Kunststoff, die dazu bestimmt sind, mit Lebensmitteln in Beriihrung zu kommen, und zur Anderung der Verordnung (EG) Nr. 2023/2006", Verordnung (EG) Nr. 282/2008 Der Kommission, Mar. 28, 2008, pp. 9-18.
Curtzwiler, W. et al., "Certification markers for empirical quantification of post-consumer recycled content in extruded polyethylene film", Polymer Testing, vol. 65, 2018, pp. 103-110.
Endres, J., "Wissenschaftliche Stellungnahme zur Fragestellung: Kann anhand der mechanischen Eigenschaften oder identifizierter Molekulbestandteile nachgewiesen werden, dass es sich bei einem PP-oder PET-Material um ein Rezyklat handelt?", Aug. 3, 2021, 9 pages.
Gutachten, "uber die analytische Unterscheidbarkeit von Neuware und Rezyklat bei Kunststoff-Materialien aus Polypropylen und Polyethylenterephthalat", 2016, 9 pages.
Hinsken, H. et al., "Degradation of Polyolefins during Melt Processing", Polymer Degradation and Stability, vol. 34, 1991, pp. 279-293.
Hutten, I., "Handbook of Nonwoven Filter Media", Second Edition, Advanced Chemical Engineering Worldwide, 2016, 7 pages.
Jansson, A. et al., "Chemical degradation of a polypropylene material exposed to simulated recycling", Polymer Degradation and Stability, vol. 84, 2004, pp. 227-232.
La Mantia, ; "The Role of additives in the recycling of polymers", Macromol. Symp., vol. 135, 1998, pp. 157-165.
Mansor, M. R. et al., "Thermal and mechanical behaviour of recycled polypropylene/polyethylene blends of rejected unused disposables diapers", Journal of Advanced Manufacturing Technology, Jan. 2020, 13 pages.
Melz, T., "Fraunhofer-Institut fur Betriebsfestigkeit und Systemzuverlassigkeit LBF", Sep. 22, 2021, 3 pages.
Pfaendner, R. et al., "Recycling and Restabilization of Polymers for High Quality Applications. An Overview", Die Angewandte Makromolekulare Chemie., vol. 232, 1995, pp. 193-227.
Pospisil, J. et al., "The Origin and Role of Structural Inhomogeneities and Impurities in Material Recycling of Plastics", Macromol. Symp., vol. 135, 1998, pp. 247-263.

(56) References Cited

OTHER PUBLICATIONS

Pospisil, J. et al., "Upgrading of recycled plastics by restabilization—an overvew", Polymer Degradarion and Stability, vol. 48, 1995, pp. 351-358.

Qin, Y. et al., "Studies on Recycled Polyester", Textile science and clothing technology, 2019, pp. 29-67.

Romao, W. et al., "Distinguishing between virgin and post-consumption bottle-grade poly (ethylene terephthalate) using thermal properties", Polymer Testing, vol. 29, 2010, pp. 879-885.

Shen, L. et al., "Open-loop recycling: A LCA case study of PET bottle-to-fibre recycling", Resources, Conservation and Recycling, vol. 55, Issue 1, Nov. 2010, pp. 34-52.

Stangenberg, F. et al., "Quality Assessments of Recycled Plastics by Spectroscopy and Chromatography", Chromatographia, vol. 59, 2004, pp. 101-106.

Vorwort, N., "Die Europaische Norm EN ISO 9073-2 : 1996 hat den Status einer Deutschen Norm", (ISO 9073-2: 1995), Feb. 1997, 8 pages.

\* cited by examiner

VACUUM CLEANER FILTER BAGS COMPRISING RECYCLED TEXTILE MATERIALS AND/OR COTTON LINTERS

CROSS-REFERENCE TO RELATED APPLICATION

This application is a U.S. National Stage application of International Application No. PCT/EP2017/072345, filed Sep. 6, 2017, which claims the benefit of European Patent Application No. 16192650.6, filed Oct. 6, 2016, both of which are herein incorporated by reference in their entireties.

The present invention relates to vacuum cleaner filter bags composed of waste products of the textile industry. In addition, possibilities of use for waste products of the textile industry for vacuum cleaner filter bags are provided.

Filter bags composed of nonwovens have practically completely displaced paper filter bags over the past 10 years due to the considerably better properties in use. The separation performance, the tendency to clog, and the mechanical strength have in particular been continuously improved. The nonwovens used for this are as a rule formed from thermoplastics, in particular polypropylene (PP) and/or polyester (PET).

Even though there is still a need for improvement of these properties, it is nevertheless noticeable that the high costs for the complex filter designs are finding less and less acceptance among end customers. In addition, the use of high-quality and heavy nonwovens for a disposable product is looked at more and more critically for ecological reasons.

Biologically degradable filter bags such as have been proposed in EP 2 301 404 and WO 2011/047764 also do not seem to be a promising approach to improve ecological properties since filter bags are often disposed of via garbage incineration and a composting can already not be considered simply due to the primarily non-biologically degradable vacuumed product.

Nonwoven filter bags for vacuum cleaners always consist of multiple layers today (EP 1 198 280, EP 2 433 695, EP 1 254 693). Support layers are used to achieve the required mechanical strength; coarse filter layers that have a high storage capacity for dust without the air resistance increasing too much; and fine filter layers for filtering particles <1 µm.

For some years diffusers and partition walls have additionally been used in filter bags that are intended to optimize the flow conditions in the filter bag in order thus to increase service life.

The most varied technologies are used to produce these different materials. Melt blown microfiber nonwovens are mostly used as the fine filter layer. These melt blown nonwovens are extrusion nonwovens, typically comprise polypropylene and have filament diameters in the range from less than 1. µm up to some few µm. These materials are electrostatically charged (e.g. by means of corona discharge) to achieve high separation performance. It has been proposed for a further improvement of the separation performance to apply nanofibers manufactured in an electrospinning process to nonwoven carrier materials (DE 199 19 809).

Both carded staple fiber nonwovens and extrusion nonwovens, but also fibrous webs (EP 1 795 247) from staple fibers or filaments are used for the capacity layer. Polypropylene or polyester, but also fluff pulp (EP 0 960 645, EP 1 198 280) are used as materials for capacity layers.

The use of recycled plastics (e.g. recycled polyethylene terephthalate (rPET)) for fabrics was proposed in WO 2013/106392.

The use of rPET as a raw material for melt blown nonwovens has already been examined (Handbook of Nonwovens, Woodhead Publishing Ltd., Ed. by S. J. Russelt, Chapter 4.10.1).

CN 101747596 describes the use of recycled PET and recycled PBT (rPET/rPBT) as a material for microfilaments.

EP 0 960 645 A2 describes vacuum cleaner filter bags that are built up of multiple layers and have a capacity layer. The capacity layer here is formed from cellulose fibers that can be bound to a nonwoven either by application of a spray adhesive (e.g. latex) or by means of thermally actuable bicomponent fibers. The not fully sufficient dust storage capacity and the service life are, however, always disadvantageous with such filter materials Vacuum cleaner filter bags composed of nonwoven materials are known from US 2009/223190 A1 that are formed from a solidified recycled material. The manufacture takes place here by saturating a fibrous web layer composed of recycled materials, by pressing out the excess adhesive, and by hardening the adhesive. Both a mechanical and an adhesive solidification of the material hereby takes place. The filter material manufactured in accordance with this manufacturing process has a very small volume, but high mechanical strength. The unsatisfactory dust storage capacity is a disadvantage in such methods.

Starting from this, it is thus the object of the present invention to provide vacuum cleaner filter bags that are in no way inferior to the vacuum cleaner filter bags available on the market in the aspects of dust separation performance and service life and that thus have excellent properties in use, but are primarily composed of recycled materials or from waste materials. It is therefore in particular the object of the present invention to implement vacuum cleaner filter bags that are particularly advantageous ecologically and economically. A proportion of recycled materials in the filter bag of at least 40% should preferably be achieved.

This object is achieved by a vacuum cleaner filter bag in accordance with claim 1. The dependent claims in this respect set forth advantageous further developments. Possibilities of use of nonwovens that comprise fibrous and/or pulverulent recycled textile material and/or cotton linters are provided for vacuum cleaner filter bags by claim 18.

The present invention thus relates to a vacuum cleaner filter bag that comprises a wail composed of an air-permeable material and surrounding an inner space. An inlet opening is introduced into the air-permeable material. The vacuum cleaner filter bag in accordance with the invention is characterized in that the air-permeable material comprises at least one layer of a nonwoven that comprises fibrous and/or pulverulent recycled textile material and/or cotton linters.

The fibrous and/or pulverulent recycled textile material can be obtained from textile waste, for example, Textile waste includes as a general term the groups of production waste (pre-consumer waste) and used textiles (post-consumer waste). Fibrous and/or pulverulent raw materials that arise in the manufacture and/or processing of textiles are suitable as alternative or additional sources for the fibrous and/or pulverulent recycled textile material; these raw materials are equally to be counted among the pre-consumer waste. Cotton linters can furthermore be used as the fibrous and/or pulverulent recycled textile material. The different categories of the raw materials for the fibrous and/or pulverulent recycled textile material for the purpose of the present invention will be explained in more detail in the following.

Fibers from Textile Production Waste and/or Used Textiles

Textile production waste is unavoidable waste that arises along the entire technological chain of the manufacture of textiles. These textile materials represent pre-consumer waste. As a rule, they have a continuous occurrence with a constant and known composition and are typically acquirable in a homogeneous manner. Such production waste in particular includes cutting waste or marginal strips. Used textiles (old textiles, waste textiles) primarily occur in private households (old clothes originating from the domestic or foreign markets) and increasingly in the communal sector and in the service sector as well as in industry (see "Vliesstoffe", 2nd Edition, Wiley-VCH, 2012, edited by H. Fuchs, W. Albrecht)

Individual fibers are present bound to form a textile in the previously addressed textile production waste and used textiles (old textiles). The production waste or used textiles are, for example, opened or broken up to separate the fibers forming the textiles to generate the fibrous and/or pulverulent recycled textile material. The so-called "reprocessing method" that is e.g. presented in Chapter 1.3 of "Vliesstoffe", 2nd Edition, Wiley-VCH, 2012, edited by H. Fuchs, W. Albrecht is in particular suitable for this purpose. So-called "reprocessed fibers" are produced here that can in particular be used for the purposes of the manufacture of the nonwoven layer of the vacuum cleaner filter bag of the present invention. The reprocessed fibers produced in the reprocessing method can optionally be further opened and comminuted by means of hammer raffling. Pulverulent elements of the opened textiles that may arise in the reprocessing method and that arise as elements of the fibers from textile production waste and/or used textiles can be worked into the nonwoven layer of the vacuum cleaner filter bag. Alternatively, the pulverulent elements can also be dispensed with in that they are, for example, separated by means of a screening process.

The textile production waste or used textiles or waste textiles can be all other kinds of textile materials such as textiles composed of natural fibers (e.g. hemp, jute, flax, ramie, coconut, linen, sisal, wool, cashmere, silk) or composed of chemical fibers (e.g. polyester, polyamide, viscose) and mixtures of the above-named textiles.

Reprocessed fibers, in particular reprocessed fibers produced from cotton textiles, are particularly preferably used for the purposes of the present invention.

Fibrous and/or Pulverulent Raw Materials from the Manufacture and/or Processing of Textiles Alternatively or additionally to the textile materials addressed above, fibrous and/or pulverulent raw materials can also be used for the production of the nonwoven layer that are incurred in the manufacture and/or processing of textiles. Such fibrous and/or pulverulent recycled textile materials are unavoidably incurred in the manufacture and/or processing of textiles such as spinning, the manufacture, cutting, drying, or recycling of textile materials. Spinning waste is in particular suitable as an appropriate raw material. These fibrous and/or pulverulent materials represent waste materials that can be deposited on the machines or filter materials used for the processing of the textiles. The powders or fibers are normally disposed of and thermally utilized. Unlike the above-described waste textiles, the fibers or powders in raw materials arising from the manufacture and/or processing of textile materials are already present in separated form so that such materials do not have to be further opened (or only have to be slightly opened) and can be directly further processed. However, these raw materials can also be subjected to further opening processes such as a treatment with a hammer mill to influence the fiber dimensions. These raw materials can be (homogeneous) cotton materials; however, all other kinds of materials are also conceivable that are used in textile production such as natural fibers (e.g. hemp, jute, flax, ramie, coconut, linen, sisal, wool, cashmere, silk) or chemical fibers (e.g. polyester, polyamide, viscose) and mixtures of the above-named textiles.

Cotton Linters

Cotton linters are short cotton fibers that adhere to the cotton core after the long seed hair (cotton) has been removed from the core. Cotton linters differ greatly in fiber length (1 to 6 mm) and in the degree of purity, they are not spinnable, and normally represent a non-recyclable raw material and thus a waste product in the textile industry. Cotton linters can also be used for nonwovens that can be used in air-permeable materials for the vacuum cleaner filter bags in accordance with the invention.

Combinations of two or of all the previously explained raw materials are equally conceivable for the manufacture of the nonwoven layer in accordance with the present invention.

A small degree of additional admixture of particularly fine and short staple fibers (microfibers) to the previously addressed starting materials for the nonwoven that is used in the vacuum cleaner filter bags in accordance with the present invention can equally be advantageous. These microfibers can be admixed both to the fibers from textile production waste/used textiles, to the fibrous and/or pulverulent raw materials from the manufacture and/or processing of textiles and/or to the cotton linters. Such fibers are, for example, available under the name Cyphrex from the EASTMAN company. The type Cyphrex 10001, for example, has a diameter of approximately 2.5 µm at a length of 1.5 mm. The pore size can be further advantageously influenced by these or similar microdenier PET staple fibers.

The fibrous and/or pulverulent recycled material or the cotton linters is/are bound in the nonwoven layer that is contained in the air-permeable material. The nonwoven material has passed through a bonding step in this regard. The bonding of the pulverulent and/or fibrous recycled material and/or of the cotton linter preferably takes place here in that bonding fibers that can, for example, be thermally activated are admixed to the nonwoven layer.

The characterizing feature of the nonwoven layer that is included in the vacuum cleaner filter bag in accordance with the invention is the specific volume. In accordance with the invention, the specific volume v of the layer of the nonwoven amounts to at least 20 $cm^3/g$.

The specific volume here means the ratio of volume to mass. The specific volume is defined in accordance with the formula shown in the following:

$$v = 1/\delta = V/m$$

In the above-shown formula, V is the volume of the measured sample, m is the mass of the sample, and $\delta$ is the volumetric weight of a measured sample of a nonwoven. The volumetric weight here represents the density of the nonwoven, based on the volume including the pore spaces.

The determination of the volumetric weight can in this respect in particular be determined with existing layers of nonwovens by determining the mass per unit of area (DIN EN 29 0734: 1992-08) of a sample of the nonwoven layer and the thickness (determined as per DIN EN ISO 9073-2: 1996, test device as per Chapter 5.1: normal nonwovens). The determination of the mass per unit of area for the purposes of the present invention always takes place as per Chapter 5.1 of the quoted standard, independently of the absolute thickness of the nonwoven layer. The mass per unit of area is also synonymously called "grammage" in text books.

The raw density is here determined as follows:

$$\delta = G/d$$

where: G is the mass per unit of area of the layer of the nonwoven and d is the thickness, determined as per DIN EN ISO 9073-2: 1996, Chapter 5.1—normal nonwovens.

It has surprisingly been found that the vacuum cleaner filter bags in accordance with the invention have a better dust storage capability compared with vacuum cleaner filter bags from the prior art, in particular those vacuum cleaner filter bags known from EP 0 960 645 A2. It was able to be shown in an unforeseeable manner here that a nonwoven that is based on ecologically better materials, that is, waste materials from waste textiles or waste materials from textile production, has a better performance (constant suction power). This improvement correlates with the still larger pore volume. This material property can be described by the higher specific volume or by the smaller volumetric weight of the new material.

A preferred embodiment provides that the specific volume of the at least one layer of nonwoven amounts to 20-500 cm$^3$/g, preferably 25-250 cm$^3$/g, further preferably 30-100 cm$^3$/g, in particular 40-60 cm$^3$/g.

The manufacture of a corresponding nonwoven layer can take place, for example, in that the fibrous and/or pulverulent recycled textile material and/or the cotton linters are laid down together with the bonding fibers in an aerodynamic process (airlaid or airlay process) and a bonding to form the completed nonwoven subsequently takes place by thermal activation of the bonding fibers.

A corresponding manufacturing process for manufacturing nonwovens by means of an airlaid process and a binding of the fibers is described in EP 0 960 645 A2. The manufacturing process described there for fluff pulp and cellulose fibers can also be used for the purposes of the present invention and is to this extent also taken over for the subject matter of the present patent application.

Provision is made in a preferred embodiment that the at least one layer of nonwoven comprising fibrous and/or pulverulent recycled textile material and/or cotton linters comprises or consists of up to 95 wt %, preferably 50 to 90 wt %, of the fibrous and/or pulverulent recycled textile material and/or cotton linters and at least 5 wt %, preferably 10 to 50 wt % bonding fibers, in particular bicomponent fibers.

The bonding fibers can here represent so-called "fusing fibers" that are formed from thermoplastic meltable materials. These fusing fibers melt during the thermal activation and bond the pulverulent and/or fibrous recycled material or the cotton linters.

It is further advantageous here that the bicomponent fibers preferably used as bonding fibers comprise a core comprising a first thermoplastic material and a sheath comprising a second thermoplastic material that melts at lower temperatures in comparison with the first thermoplastic material, with the core or both the core and the sheath comprising a recycled plastic or a plurality of recycled plastics. The other customary variants of bicomponent fibers (e.g. side by side) can also be considered in addition to core/sheath bicomponent fibers.

The fusing fibers or bicomponent fibers preferably used as bonding fibers can here partially or completely comprise recycled plastics.

In a preferred embodiment, the bonding fibers are staple fibers, in particular having a length of 1 to 75 mm, preferably 2 to 25 mm.

A nonwoven such as is described in WO 2011/057641 A1 can, for example, be used for the purposes of the present invention. All the embodiments of this patent application are taken over for the purposes of the present invention. The disclosure content of this document is thus also made the subject of the present application.

In a further preferred embodiment, the air-permeable material is structured in multiple layers, with the air-permeable material having at least one further layer in addition to the at least one layer of the nonwoven that comprises fibrous and/or pulverulent recycled textile material and/or cotton linters, said further layer comprising or being formed from a nonwoven and/or a fibrous web, with in particular at least one, a plurality of, or all of the additional layers comprising or being formed from one or a plurality of recycled plastics.

The term "recycled plastic" used for the purposes of the present invention is to be understood here as synonymous with plastic recyclates. Reference is made to the standard DIN EN 15347:2007 with respect to the definition of terms.

At least one of these additional layers is thus preferably a nonwoven or a fibrous web that comprises recycled plastics and is in particular formed from recycled plastics. Unlike vacuum cleaner filter bags known from the prior art, less or even no fresh (virgin) plastic material is used for the manufacture of the nonwovens or fibrous webs forming the basis of the wall of the vacuum cleaner filter bags, it is rather the case that primarily or only plastics are used that had already been used once and were reacquired by corresponding recycling processes. Such filter bags are very advantageous from an ecological aspect since they can be manufactured as raw material neutral to a high degree. These filter bags equally provide economic advantages since most recycled plastic materials can be obtained considerably more favorably than the corresponding raw materials that are not recycled ("virgin" plastics).

In the sense of the present invention, a nonwoven here designates a tangled mat that has run through a solidification step so that is has sufficient strength to be wound up or off to form rolls, for example. A fibrous web corresponds to a tangled mat that has, however, not run through any solidification step so that unlike a nonwoven such a tangled mat does not have sufficient strength to be found up or off to form rolls, for example. Reference is made with respect to the definition of this terminology to EP 1 795 427 A1 whose disclosure content is made the subject of the present patent application in this respect.

In accordance with a preferred embodiment, the fibers of the at least one additional layer of the nonwoven or of the fibrous web that is included in the air-permeable material of the wall of the vacuum cleaner filter bag in accordance with the invention is formed from a single recycled plastic material.

It is, however, alternatively equally preferred for the fibers of the at least one additional layer of the nonwoven or of the fibrous web to be formed from different materials of which at least one represents a recycled plastic. Two embodiments are in particular conceivable here.

On the one hand, it can be a mixture of at least two fiber types, for example fiber mixtures that are formed from at least two different recycled plastics.

On the other hand, it is equally possible that the at least one additional layer of the fibrous mat or of the nonwoven includes or is formed from bicomponent fibers (bico fibers) that comprise a core and a sheath surrounding the core. The core and the sheath are formed from different materials here. The bicomponent fibers can be present as staple fibers or can be configured as an extrusion nonwoven (for example from a melt blown nonwoven) so that the bicomponent fibers theoretically have infinite length and represent so-called filaments. It is of advantage with such bicomponent fibers if at least the core is formed from a recycled plastic; a virgin plastic can, for example, also be used for the sheath, but alternatively equally a different recycled plastic.

It is possible for the purposes of the present invention for the nonwovens or fibrous mats of the at least one additional layer that they are dry laid, wet laid or extrusion nonwovens. The fibers of the nonwovens or fibrous mats can accordingly have finite length (staple fibers), but also theoretically infinite length (filaments).

The structure of the wall of the filter bag in accordance with the present invention can overall equally be designed as described in EP 1 795 247. Such a wall thus comprises at least three layers, with at least two layers comprising at least one nonwoven layer and at least one fibrous mat layer containing staple fibers and/or filaments. The wall of the vacuum cleaner filter bag is accordingly additionally characterized by a weld connection in which all the layers of the filter material are connected to one another by weld connections. The pressing surface ratio of the weld pattern here amounts to a maximum of 5% of the surface of the area of the filter material or of the vacuum cleaner filter bag that can be flowed through. On average, a maximum of 19 weld connections per 10 cm$^2$ are present with respect to the total area of the filter bag that can be flowed through. At least one of the nonwoven layers is here configured in accordance with the above-addressed nonwoven layer that comprises fibrous and/or pulverulent recycled textile material and/or cotton linters.

The air-permeable material can, for example, be configured in a manner such as is described in the introductory part of the present patent application, that is e.g. as in EP 1 198 280, EP 2 433 695, EP 1 254 693, DE 199 19 809, EP 1 795 247, WO 2013/106 392 or CN 101747596, as long as pulverulent and/or fibrous recycled material from the manufacture of textiles and/or cotton linters was used for the manufacture of these filter materials. Reference is made with respect to the detailed structure of these filter materials to the disclosure content of these documents that are also to be considered as part of the disclosure content of the present invention.

The present invention covers a plurality of particularly preferred possibilities of the multilayer design of the air-permeable material that will be presented in the following. The majority of these layers can be connected to one another by means of weld connections, in particular as described in EP 1 795 427 A1.

The layers can also be adhesively bonded to one another or bonded as described in WO 01/003802.

The following embodiments are in particular advantageous in the above-named multilayer design of the air-permeable material.

In accordance with a first preferred embodiment, the air-permeable material has at least one support layer and at least one capacity layer, with at least one of the support layers or all of the support layers representing nonwovens and/or with at least one or all of the capacity layers representing nonwovens or fibrous mats that comprise or are formed from a recycled plastic or a plurality of recycled plastics.

Alternatively to this, it is equally possible that the air-permeable material has at least one support layer, at least one fine filter layer, and at least one capacity layer, with at least one or all of the support layers and/or at least one or all of the fine filter layers representing nonwovens that comprise or are formed from a recycled plastic or a plurality of recycled plastics and/or with at least one or all of the capacity layers representing nonwovens or fibrous mats that comprise or are formed from a recycled plastic or a plurality of recycled plastics.

Provision is made with the two above-named embodiments that at least one, preferably all, of the capacity layers comprise or are formed from the nonwoven that is characterized in more detail above and that comprises fibrous and/or pulverulent recycled textile material and/or cotton linters. The nonwoven layer formed as a capacity layer here has such a high mechanical strength due to the nonwoven bonding that it can also act as a support layer.

It is equally possible to make the outer layer on the clean air side from a relatively thin material based on cotton powder.

The individual layers here are designated in more detail in accordance with their functions.

A support layer in the sense of the present invention is here a layer that gives the multilayer compound of the filter material the required mechanical strength. An open, porous nonwoven or a nonwoven having a light grammage is designated by this. A support layer primarily serves to support other layers or films and to protect them from abrasion. The support layer can also filter the largest particles. The support layer, also like every other layer of the filter material, can optionally also be electrostatically charged under the condition that the material has suitable dielectric properties.

A capacity layer provides high resistance to impact load, filtration of large dirt particles, filtration of a significant portion of small dirt particles, and storage or retention of large amounts of particles, with the air being allowed to flow through simply and with thus a small pressure drop resulting at high particle load. This in particular has an effect on the service life of a vacuum cleaner filter bag.

A fine filter layer serves to increase the filtration performance of the multilayer filter material by capturing particles that, for example, pass through the support layer and/or the capacity layer. To further increase the fine filter layer, it can preferably be electrostatically charged (e.g. by corona discharge) in order in particular to increase the separation of fine dust particles.

An overview of the individual functional layers within multilayer filter materials for vacuum cleaner filter bags is provided by WO 01/003802. The air-permeable material of the wall of the vacuum cleaner filter bag in accordance with the invention can, for example, have a structure as in this patent document with respect to its design, with the proviso that at least one of the layers of the multilayer filter material for the vacuum cleaner filter bag described there is formed from a recycled plastic or from a plurality of recycled plastics. The disclosure content of WO 01/003802 is equally incorporated into the present application with respect to the design of the air-permeable filter materials.

Specific embodiments of the previously named aspects of the present invention provide that each support layer is a spunbond or scrim, preferably having a mass per unit of area of 5 to 80 g/m$^2$, further preferably of 10 to 50 g/m$^2$, further preferably of 15 to 30 g/m$^2$ and/or preferably having a yarn count of the fibers forming the spunbond or the scrim in the range from 0.5 dtex to 15 dtex.

The air-permeable material preferably has one to three support layers.

In the case of the presence of at least two support layers, it is preferred that the total grammage of the sum of all support layers is 10 to 240 g/m$^2$, preferably 15 to 150 g/m$^2$, further preferably 20 to 100 g/m$^2$, further preferably 30 to 90 g/m$^2$, in particular 40 to 70 g/m$^2$.

Alternatively or additionally to the above-named embodiments, it is equally possible that all the support layers are formed from a recycled plastic or from a plurality of recycled plastics, in particular from rPET.

It is of advantage with the previously named fine filter layers if every fine filter layer is an extrusion nonwoven, in particular a melt blown nonwoven, preferably having a mass per unit of area of 5 to 100 g/m$^2$, preferably 10 to 50 g/m$^2$, in particular 10 to 30 g/m$^2$.

The air-permeable material for the purposes of the vacuum cleaner filter bag in accordance with the invention can here advantageously comprise one to five fine filter layers.

In the case of the presence of at least two fine filter layers, the total grammage of the sum of all the fine filter layers can amount to 10 to 300 g/m$^2$, preferably 15 to 150 g/m$^2$, in particular 20 to 50 g/m$^2$.

All the fine filter layers are preferably formed from a recycled plastic or from a plurality of recycled plastics, in particular rPET.

Particularly preferred fine filter layers here are melt blown nonwovens that can in particular be formed from rPET. The rPET used can here be non-metallized or metallized. The rPET can thus, for example, originate from beverage bottles (bottle flake chips) or from metallized PET films. It is equally possible that the melt blown nonwovens represent bicomponent melt blown nonwovens. It is in particular of advantage here if the core of such a bicomponent fiber comprises rPET; this core material is enveloped by a further thermoplastic, for example polypropylene.

Alternatively or additionally to the previously named embodiments, it is equally possible and in particular preferred if at least one, preferably all, fine filter layers are electrostatically charged. This requires that at least the surface of the fibers to be charged is formed from a dielectric material. In the case of a use of metallized PET recyclate, this embodiment is then only possible within the framework of the previously addressed bicomponent fibers in which the metallized rPET forms the core of the fibers. The electrostatic charging can in particular take place by corona discharge.

It is in particular of advantage with the previously named capacity layers if at least one, preferably every, capacity layer is a nonwoven that comprises fibrous and/or pulverulent recycled textile material and/or cotton linters, with each capacity layer preferably having a mass per unit of area of 5 to 200 g/m$^2$, further preferably of 10 to 150 g/m$^2$, further preferably of 20 to 100 g/m$^2$, in particular 30 to 50 g/m$^2$.

The air-permeable material preferably has one to five capacity layers.

In the case of the presence of at least two capacity layers, the total grammage of the sum of all the capacity layers can amount to 10 to 300 g/m$^2$, preferably 15 to 200 g/m$^2$, further preferably 20 to 100 g/m$^2$, in particular 50 to 90 g/m$^2$.

A particularly preferred embodiment provides the following multilayer variants for the air-permeable material having a layer sequence looked at from the inner space of the vacuum cleaner filter bag:

One support layer, at least one, preferably at least two, capacity layers, preferably one further support layer, at least one, preferably at least two, fine filter layers, and one further support layer. For the case that the capacity layer has high mechanical strength as described above, the innermost support layer can also be omitted here.

One or two capacity layers, one or two fine filter layers (melt blown layers), one support layer (spunbond).

The support layers and/or capacity layers can here be formed from a nonwoven material that comprises pulverulent and/or fibrous recycled material from the manufacture of textiles, in particular cotton textiles, and/or cotton linters.

In a particularly preferred embodiment, this nonwoven material forms the at least one capacity layer while the other layers do not comprise any pulverulent and/or fibrous recycled material from the manufacture of textiles, in particular cotton textiles and/or cotton linters.

All the layers in the previously named embodiments can also be connected to one another by means of weld connections, in particular as described in EP 1 795 427 A1. Weld connections are, however, not absolutely necessary.

It is further advantageous that the vacuum cleaner filter bag has a holding plate that encloses the inlet opening and that is formed from one or more recycled plastics or comprises one or more recycled plastics. The holding plate is in particular formed from rPET or comprises rPET to a very high degree here, for example at least 90 wt %. In accordance with this preferred embodiment, a further increase of the proportion of recycled plastics in the vacuum cleaner filter bag is also possible.

Provision is made in accordance with a further preferred embodiment that a flow distributor and/or at least one diffuser is/are arranged in the inner space, with the at least one flow distributor and/or the at least one diffuser preferably being formed from a recycled plastic or from a plurality of recycled plastics or from a nonwoven that comprises fibrous and/or pulverulent recycled textile material and/or cotton linters. Such flow distributors and diffusers are e.g. known from the patent applications EP 2 263 508, EP 2 442 703, DE 20 2006 020 047, DE 20 2008 003 248, and DE 20 2008 005 050. The vacuum cleaner filter bags in accordance with the invention including flow distributors can also be correspondingly designed.

Flow distributors and diffusers are thus preferably likewise produced from nonwovens or laminates of nonwovens. The same materials can preferably be considered for these elements as for the capacity layers and reinforcement layers.

The recycled plastic that can be used in specific nonwoven materials or in holding plates for the vacuum cleaner filter bags is here preferably selected from the group comprising recycled polyesters, in particular recycled polyethylene terephthalate (rPET), recycled polybutylene terephthalate (rPBT), recycled polylactic acid (rPLA), recycled polyglycolide acid and/or recycled polycapralcatone; recycled polyolefins, in particular recycled polypropylene (rPP), recycled polyethylene and/or recycled polystyrene (rPS); recycled polyvinyl chloride (rPVC), recycled polyamides, and mixtures and combinations thereof.

Relevant international standards exist for many plastic recyclates, DIN EN 15353:2007 is, for example, relevant to PET plastic recyclates. PS recyclates are described in more detail in DIN EN 15342:2008. PE recyclates are treated in DIN EN 15344:2008. PP recyclates are characterized in DIN EN 15345:2008. PVC recyclates are treated in more detail in DIN EN 15346:2015. For the purposes of the corresponding specific plastic recyclates, the present patent application incorporates the definitions of these international standards. The plastic recyclates can be unmetallized here. An example for this is represented by plastic flakes or chips reclaimed from PET bottles. The plastic recyclates can equally be metallized, e.g. when the recyclates were obtained from metallic plastic films, in particular metallized PET films (MPET).

The recycled plastic is in particular recycled polyethylene terephthalate (rPET) that was obtained, for example from beverage bottles, in particular from bottle flakes, that is, pieces of milled beverage bottles.

The recycled plastics, in particular the recycled PET, both in the metallized and in the non-metallized version, can be spun to form the corresponding fibers from which the corresponding staple fibers or melt blown or spunbond nonwovens can be manufactured for the purposes of the present invention.

A particularly preferred embodiment provides that the weight sum of the fibrous and/or pulverulent recycled textile materials and/or cotton linters and of the optionally present recycled materials amounts, with respect to the total weight of the vacuum cleaner filter bag, to at least 25%, preferably at least 30%, further preferably at least 40%, further preferably at least 50%, further preferably at least 60%, further preferably at least 70%, further preferably at least 80%, further preferably at least 90%, in particular at least 95%.

The vacuum cleaner filter bag In accordance with the present invention can be formed, for example in the form of a flat bag, a side gusseted bag, a block bottom bag, or a 3D bag such as a vacuum cleaner filter bag for an upright vacuum cleaner. A flat bag here has no side wails and is formed from two material layers, with the two material layers being directly connected, for example welded or adhesively bonded, to one another along their peripheries. Side gusseted bags represent a modified form of a flat bag and comprise side gussets that are fixed or can be protruded. Block base bags include a so-called block bottom that typically forms the narrow side of the vacuum cleaner filter bag; a holding plate is arranged at this side as a rule.

Particularly preferred embodiments of the vacuum cleaner filter bags in accordance with the invention will be described in the following.

Filter bags can preferably be designed that have a layer of a nonwoven produced in accordance with an aerodynamic process (for example an airlay or airlaid process) and having a specific volume of at least 20 cm$^3$/g and that consist of or comprise fibrous and/or pulverulent recycled textile materials. The filter bags can, however, also comprise a plurality of layers of this airlay or airlaid nonwoven. In addition, one or more nonwoven layers can be present that are formed from or comprise recycled plastics. The different nonwovens are here only suitable for specific material layers. To even further increase the proportion of recycled raw materials, the use of a holding plate is additionally also possible that consists of or comprises rPET.

With respect to the individual filter layers:

In particular spunbond nonwoven layers of rPET having a grammage of 5 to 50 g/m$^2$ and a yarn count of 1 dtex to 15 dtex can be considered as the support layers. PET waste (e.g. stamped waste) and so-called bottle flakes, that is, pieces of milled beverage bottles) is used as the raw material. It is possible to dye the recyclate to cover the different colors of the waste. The HELIX® (Comerio Ercole) process is in particular advantageous as a thermal bonding process for the solidification of the spunbond nonwoven.

One or more layers of melt blown having a grammage of in each case 5 to 30 g/m$^2$ are used as the fine filter layers. These fine filter layers can be formed from polypropylene or from polyesters, in particular rPET. At least this layer or these layers is/are electrostatically charged by a corona discharge. For the case that the fine filter layers are formed from rPET, they can likewise be electrostatically charged. Care only has to be taken here that then no metallized PET waste is used for the production. To improve the charge persistence, the plastics used can be provided with charge-stabilizing additives. Alternatively, the melt blow filaments can also comprise bicomponent fibers in which the core is formed from e.g. rPET and the envelope from a plastic that can be particularly easily electrostatically charged (e.g. PP, PC, PET).

One or more capacity layers are preferably included in the vacuum cleaner filter bag that represent a nonwoven material that is manufactured from reprocessed fibers or spinning waste and a suitable component for solidifying the nonwoven, e.g. bicomponent fibers. Different methods are suitable for the manufacture of capacity layers. Carding processes or aerodynamic processes are customary in which first staple fibers are placed down that are then typically solidified to form a nonwoven in a nonwoven bonding step (e.g. by needling, water jet solidification, ultrasound calendering, or also by means of thermal solidification in a throughflow furnace, also by means of bicomponent fibers or bonding fibers). In particular the HELIX® (Comerio Ercole) process is suitable for calendering. The capacity layers can equally include proportions of recycled plastic materials, e.g. rPET staple fibers or rPET filaments that can be used as bonding fibers, in particular bicomponent fibers for manufacturing the nonwoven.

A method can likewise be used in which the primarily produced fibrous web is not solidified, but is rather bonded to a nonwoven with as few weld points as possible. This method is, however, not suitable for the variant composed of cotton powder. It is possible to use staple fibers of rPET in both methods. Capacity layers can also be produced from extrusion nonwovens or extrusion fibrous webs. A use of rPET can likewise be realized without problem for these nonwovens.

The filaments or staple fibers can also comprise bicomponent materials in which the core is formed from e.g. rPET and the envelope from a plastic that can be particularly easily electrostatically charged (e.g. PP, PC, PET).

Alternatively or additionally, one or more layers of an airlaid or airlay nonwoven can also be present that is formed from bicomponent fibers and cotton powder.

The grammage of the individual capacity layers is preferably between 5 and 200 g/m$^2$.

The differently manufactured capacity layers can naturally also be combined with one another.

Exemplary capacity layers and in particular capacity layers that can be used in the vacuum cleaner filter bags in accordance with the invention are listed in the following table here:

|  | 1 | 2 | 3 | 4 | 5 | 6 |
|---|---|---|---|---|---|---|
|  |  |  | Capacity layers in accordance with the invention | | | |
|  | Capacity layer from spinning waste bonded with 35 wt % PET bico | Capacity layer from spinning waste bonded with 35 wt % PET bico | Capacity layer from spinning waste, treated (hammer mill, screen 3 mm), bonded with 35 wt % PET bico | Capacity layer from reprocessed fibers bonded with 35 wt % PET bico | Capacity layer from reprocessed fibers, all treated (hammer mill, screen 6 mm), bonded with 35 wt % PET bico | Capacity layer from reprocessed fibers, all treated (hammer mill, screen 12 mm), bonded with 35 wt % PET bico |
| Mass per unit of area [g/m$^2$] | 93.4 | 103 | 82.4 | 103.7 | 90.8 | 74.9 |
| Thickness [mm] as per DIN EN ISO 9073-2: 1996 Test device as per 5.1: Normal nonwovens | 4.8 | 5.09 | 4.17 | 5.07 | 4.99 | 3.34 |
| Volumetric weight [g/cm$^3$] | 0.019 | 0.020 | 0.020 | 0.020 | 0.018 | 0.022 |
| Specific volume [cm$^3$/g] | 51.4 | 49.5 | 50.6 | 48.9 | 55.0 | 44.6 |

The capacity layers of examples 1 to 3 are here formed from bonded spinning waste (staple fibers and powder). The spinning waste is here bonded with bicomponent fibers of PET; the weight ratio of the bicomponent PET fibers in the total capacity layer is 35 wt %. The capacity layers in accordance with examples 1 and 2 differ only with respect to their grammage; the capacity layer in accordance with example 2 is here slightly thicker than the capacity layer in accordance with example 1.

The capacity layer in accordance with example 3 is formed from treated spinning waste. The spinning waste is here comminuted using a hammer mill and is screened using a screen (opening width 3 mm). The screened fraction of treated spinning waste is bonded to a 35 wt % proportion of bicomponent PET fibers.

The capacity layers of examples 4 and 5 are based on reprocessed fibers. Opened textile waste that is otherwise not further treated is used in example 4; the reprocessed fibers in accordance with example 5 have likewise been subjected to a hammer mill process; the products arising are here screened by a screen (opening width 6 mm).

The capacity layer in accordance with example 6 is formed in an analog manner to the capacity layer in accordance with example 5; the mesh width of the screen is, however, 12 mm.

The use of a holding plate from rPET is possible to further increase the proportion of recyclates. If the sealing toward the vacuum cleaner nozzle is taken over by the bag material, the holding plate can solely comprise rPET. For the case that the holding plate has to take over the sealing function, a TPE seal can be injected on or adhesively bonded.

A proportion of recyclates or waste substances of up to 96% thus becomes possible when using all the options.

The invention further relates to the use of nonwovens that comprise fibrous and/or pulverulent recycled textile material and/or cotton linters having a specific volume of at least 20 cm$^3$/g for vacuum cleaner filter bags. Reference is made to the above embodiments with respect to the specific embodiment of such nonwovens.

The present invention will be looked at in more detail with reference to the following exemplary embodiments without restricting the invention to the specifically shown embodiments.

The outstanding dust storage capacity of the vacuum cleaner filter bags in accordance with the invention was able to be demonstrated using a comparison between a vacuum cleaner filter bag in accordance with the invention having a capacity layer with a specific volume v of at least 20 cm$^3$/g and a vacuum cleaner filter bag composed of a material known from the prior art (EP 0 0 960 645 A2). Both vacuum cleaner filter bags are here flat bags of rectangular geometry that have a dimension of 300 mm×280 mm. The exact design of the filter bags used and the performance of the trial will be described in the following.

The bag in accordance with the invention had the following design. The air-permeable material of the vacuum cleaner filter bag had a 4-layer structure with the following material layers (viewed from the outside to the inside): The outer layer was made from spunbond (25 g/m$^2$) followed by a fine filter layer from a melt blown of 28 g/m$^2$. A reinforcement layer of spunbond of 17 g/m$^2$ followed. The following capacity layer was a nonwoven material that was formed from reprocessed fibers of textile waste that were bonded with PET bicomponents. The proportion of bicomponent fibers in this nonwoven layer amounted to 35 wt %; the proportion of reprocessed fibers to 65 wt %. The capacity layer had a grammage of 74.9 g/m$^2$, Its thickness as per DIN EN ISO 9073-2:1996, Section 5.1 was 3.34 mm. The specific volume of this capacity layer was thus 44.6 cm$^3$g. This capacity layer corresponds to example 6 of the table shown above.

The comparison bag in accordance with the prior art had the following design: Outer layer spunbond 28 g/m$^2$; fine filter layer 22 g/m$^2$, spunbond 17 g/m$^2$, airlaid nonwoven 73 g/m$^2$ (capacity layer), spunbond 17 g/m$^2$. The capacity layer was manufactured on the basis of the teaching of EP 0 960 645 A2 (paragraphs [0036] to [0038]) and is a nonwoven material of 65 wt % cellulose fibers and 35 wt % PET bicomponent fibers. It had a grammage of 73 g/m$^2$ and a thickness as per DIN EN ISO 9073-2:1996, Section 5.1 of 0.9 mm. The specific volume of this capacity layer was thus 12.3 cm$^3$g.

The dust storage capacity depends in a first approximation only on the capacity layer; the presence of a further support layer on the inner side in the comparison example can be neglected for the comparison of the dust storage capacities of the vacuum cleaner filter bags in accordance with the invention and the vacuum cleaner filter bag of the comparison example.

It was surprisingly able to be found that the volumetric weight (mass per unit of area/thickness) of the capacity layers in accordance with the invention was much smaller in all the examples (see table) than in the capacity layers known from the prior art (EP 0 960 645 A2). Conversely, the specific volume is considerably increased. The volumetric weight of the capacity layers in accordance with the invention is smaller by a factor of approximately 4 than in the capacity layer in accordance with the comparison example. The capacity layers in accordance with the invention are thus a lot more voluminous, which is in particular reflected by the specific volume of these materials.

To compare the performance of the vacuum cleaner filter bag in accordance with the invention with a vacuum cleaner filter bag from the prior art, the vacuum cleaner filter bag in accordance with the invention described above (that includes a capacity layer in accordance with example 6 in accordance with the invention) was contrasted and compared with the above-described vacuum cleaner filter bag (having a capacity layer in accordance with EP 0 960 645 A2). The volume flow in accordance with DIN EN ISO 603:13:2014 was measured in dependence on the amount of a test dust taken up (DMI test dust, type 8). The device used was a Miele C3 Ecoline that had a power consumption of 750 W. Once the motor had warmed up, an empty vacuum cleaner filter bag in accordance with example 6 or comparison example 8 was placed into the vacuum cleaner. A first measurement of the volume flow took place with the empty vacuum cleaner filter bag (0 g measurement). The measurement was repeated after vacuuming a respective further 50 g of DMT test dust, Type 8 dust.

Figure 1:
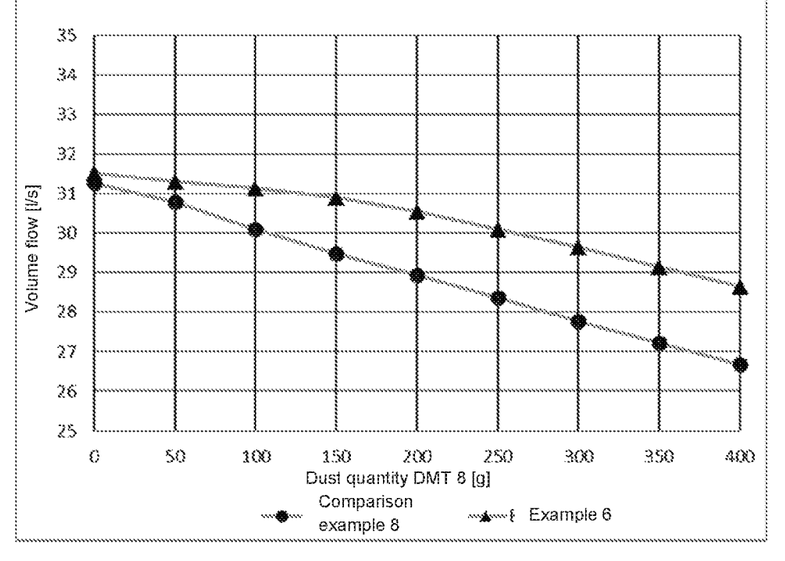

FIG. 1 shows the result of the corresponding dust charge test with DMT dust (Type 8) as per DIN EN 60312-1:2014-01. The capacity layer in accordance with the invention completely surprisingly produced a significantly smaller drop in the volume flow. Even a load with 400 g dust with the bag in accordance with the invention resulted in a reduction of the volume flow of only 9.1%, whereas the conventional bag shows a fall of 14.7%.

The increased specific volume or the reduced volumetric weight of the capacity layer contained in the vacuum cleaner filter bags in accordance with the invention thus surprisingly results in a considerable improvement of the service life.

The vacuum cleaner filter bags in accordance with the invention therefore have a considerably increased dust storage capacity and thus an extended service life.

The invention claimed is:

1. A vacuum cleaner filter bag comprising:
    a wall surrounding an inner space and including an air-permeable material and an inlet opening introduced into the wall,
    wherein the air-permeable material comprises at least one layer of a nonwoven consisting of at least one of fibrous recycled textile material, pulverulent recycled textile material, and cotton linters, with the at least one layer of the nonwoven having a specific volume of at least 20 cm$^3$/g; wherein the at least one of fibrous recycled textile material, pulverulent recycled textile material, and cotton linters includes fibers selected from the group consisting of at least one of textile production waste and used textiles.

2. The vacuum cleaner filter bag of claim 1, wherein the specific volume of the at least one layer of the nonwoven is 20 to 500 cm3/g.

3. The vacuum cleaner filter bag of claim 1, wherein the at least one layer of the nonwoven includes up to 95 wt % of the at least one of the fibrous recycled textile material, the pulverulent recycled textile material, and the cotton linters and at least 5 wt % bonding fibers.

4. The vacuum cleaner filter bag of claim 3, wherein the bonding fibers comprise staple fibers having lengths from 2 to 75 mm.

5. The vacuum cleaner filter bag of claim 3, wherein the bonding fibers include bicomponent fibers that include a core comprising a first thermoplastic material and a sheath comprising a second thermoplastic material that melts at lower temperatures in comparison with the first thermoplastic material, wherein at least one of the core and the sheath comprises at least one recycled plastic.

6. The vacuum cleaner filter bag of claim 1, wherein the air-permeable material is structured in multiple layers, with the air-permeable material having at least one further layer in addition to the at least one layer of the nonwoven, the at least one further layer comprising or being formed from at least one of a nonwoven and a fibrous web, with at least one layer of the at least one further layer comprising or being formed from at least one recycled plastic.

7. The vacuum cleaner filter bag of claim 1, wherein the air-permeable material comprises:
    at least one support layer and at least one capacity layer, with at least one of:
        one or more of the at least one support layer representing nonwovens; and
        one or more of the at least one capacity layer representing nonwovens or fibrous webs that comprise or are formed from at least one recycled plastic; or
    at least one support layer, at least one fine filter layer, and at least one capacity layer, with at least one of:
        one or more of the at least one support layer representing nonwovens that are formed from at least one recycled plastic;
        one or more of the at least one fine filter layer representing nonwovens that are formed from at least one recycled plastic; and
        one or more of the at least one capacity layer representing nonwovens or fibrous webs that comprise or are formed from at least one recycled plastic,
    with at least one layer of the at least one capacity layer comprising or being formed from the nonwoven that comprises the at least one of the fibrous recycled textile material, the pulverulent recycled textile material, and the cotton linters.

8. The vacuum cleaner filter bag of claim 7, wherein at least one of:
    each support layer is a spunbond or scrim, having one or more of a mass per unit area of 5 to 80 g/m$^2$ and a yarn count of the fibers forming the spunbond or the scrim in the range from 0.5 dtex to 15 dtex;
    the air-permeable material comprises 1 to 3 support layers;
    in the case of the presence of at least two support layers, the sum of the masses per unit area of the sum of all support layers is 10 to 240 g/m$^2$; and
    all support layers are formed from at least one recycled plastic.

9. The vacuum cleaner filter bag of claim 7, wherein at least one of:
    each fine filter layer is an extrusion nonwoven having a mass per unit of area of 5 to 100 g/m$^2$;
    the air-permeable material comprises 1 to 5 fine filter layers;
    in the case of the presence of at least two fine filter layers, the sum of the masses per unit area of the sum of all fine filter layers amounts to 10 to 300 g/m$^2$;
    one or more fine filter layers is formed from at least one recycled plastic; and
    one or more fine filter layers is electrostatically charged.

10. The vacuum cleaner filter bag of claim 7, wherein at least one of:

one or more capacity layer is the nonwoven that comprises at least one of the fibrous recycled textile material, the pulverulent recycled textile material, and the cotton linters, with each capacity layer having a mass per unit area of 5 to 200 g/m$^2$;

the air-permeable material comprises 1 to 5 capacity layers; and in the case of the presence of at least two capacity layers, the sum of the masses per unit area of the sum of all capacity layers is 10 to 300 g/m$^2$.

11. The vacuum cleaner filter bag of claim 7, wherein the air-permeable material is formed in multiple layers having a layer sequence viewed from the inner space of the vacuum cleaner filter bag of one support layer, one or more capacity layers, one or more fine filter layers, and one further support layer.

12. The vacuum cleaner filter bag of claim 1, wherein the vacuum cleaner filter bag includes a holding plate that encloses the inlet opening and that is formed from or comprises at least one recycled plastic.

13. The vacuum cleaner filter bag of claim 1, wherein at least one of a flow distributor and at least one diffuser are arranged in the inner space, wherein the at least one of the flow distributor and the at least one diffuser are formed from at least one recycled plastic or from the nonwoven that comprises the at least one of the fibrous recycled textile material, the pulverulent recycled textile material, and the cotton linters.

14. The vacuum cleaner filter bag of claim 1, comprising a recycled plastic selected from a group consisting of: recycled polyesters including recycled polyethylene terephthalate (rPET), recycled polybutylene terephthalate (rPBT), recycled polylactic acid (rPLa), recycled polyglycolide and recycled polycaprolactone; recycled polyolefins including recycled polypropylene (rPP), recycled polyethylene and recycled polystyrene (rPS); recycled polyvinyl chloride (rPVC), recycled polyamides, and mixtures and combinations thereof.

15. The vacuum cleaner filter bag of claim 1, wherein the weight proportion of all the recycled materials and the cotton linters, with respect to the total weight of the vacuum cleaner filter bag, amounts to at least 25%.

16. The vacuum cleaner filter bag of claim 1, in the form of one or more of a flat bag, a block bottom bag, and a 3D bag.

17. A vacuum cleaner filter bag comprising nonwovens consisting of at least one of fibrous recycled textile material, pulverulent recycled textile material, and cotton linters having a specific volume of at least 20 cm$^3$/g; wherein the at least one of fibrous recycled textile material, pulverulent recycled textile material, and cotton linters includes fibers selected from the group consisting of at least one of textile production waste and used textiles.

* * * * *